Jan. 6, 1970  C. B. RISSER  3,488,063
CHICKEN CARRIER CART

Filed March 7, 1967  2 Sheets-Sheet 1

Carl B. Risser
INVENTOR.

BY Clarence A. O'Brien
and Harvey B. Jacobson
Attorneys

Jan. 6, 1970  C. B. RISSER  3,488,063
CHICKEN CARRIER CART
Filed March 7, 1967  2 Sheets-Sheet 2
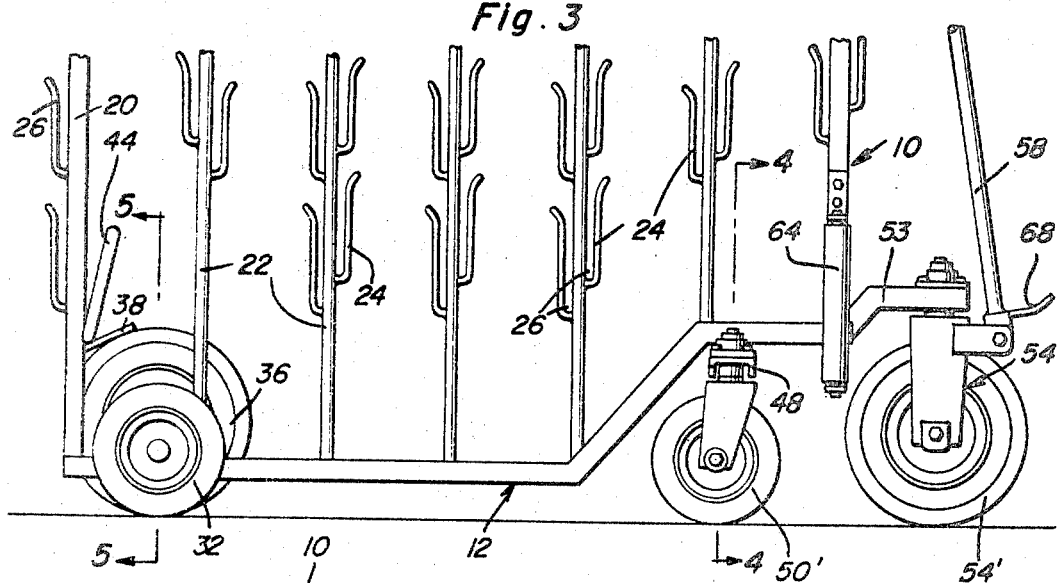
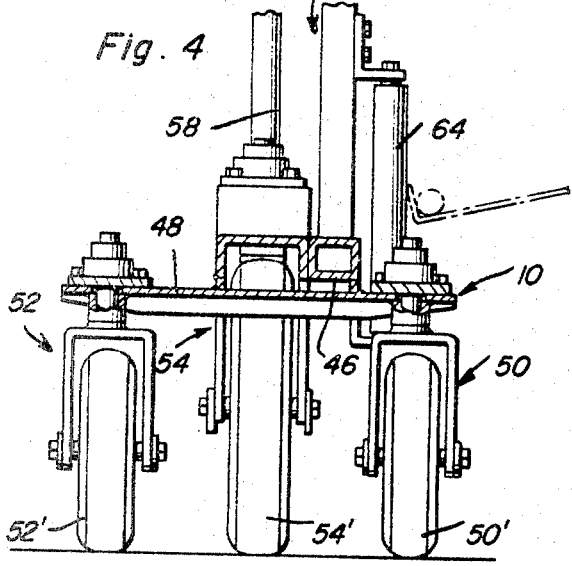
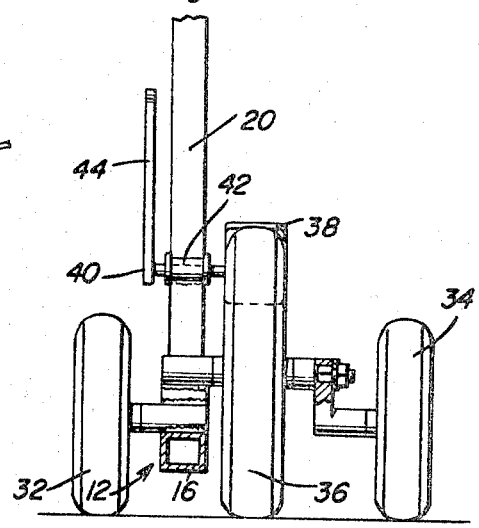
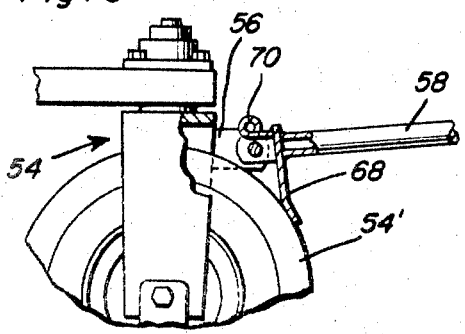
Carl B. Risser
INVENTOR.
BY Clarence A. O'Brien
and Harvey B. Jacobson
Attorneys

United States Patent Office 3,488,063
Patented Jan. 6, 1970

1

3,488,063
CHICKEN CARRIER CART
Carl B. Risser, 347 N. Broad St.,
Lititz, Pa. 17543
Filed Mar. 7, 1967, Ser. No. 621,298
Int. Cl. B62b 3/10, 3/04
U.S. Cl. 280—79.3         7 Claims

ABSTRACT OF THE DISCLOSURE

A cart including longitudinally spaced upright or upstanding portions provided with vertically spaced upwardly opening hook portions adapted to have the legs of inverted poultry such as chickens removably supported therefrom, the cart being narrow and of appreciable height relative to its width so as to be adapted to freely pass along narrow corridors in caged laying houses.

---

This invention relates to a novel and useful cart and in particular to a cart designed primarily to support live chickens during their transportation to and from laying houses.

The cart of the instant invention is quite narrow so as to be adapted to freely pass along narrow corridors in laying houses and is of appreciable vertical height relative to its width in order that a large number of chickens may be supported therefrom.

The cart includes longitudinally extending upper and lower frame portions between which upstanding portions extend and these upstanding portions are provided with upwardly opening hook portions adapted to have the legs of inverted poultry such as chickens removably supported therefrom. Accordingly, by the use of the cart of the instant invention a considerable number of chickens may be readily transported to and from a laying house with ease. The aforementioned hook portions outstand both to the rear and front of the upstanding portions of the frame of the cart and the chickens supported from these hooks by their legs in inverted positions have their body portions disposed on opposite sides of the plane in which the upstanding portions are disposed. Further, although the cart of the instant invention may be modified in length as well as height and the number of hook portions supported from each upright, the cart specifically illustrated and described hereinafter includes seven uprights with an average of nine or ten hook portions supported from each upright, the hook portions being relatively deep in vertical extent and adapted to support up to eight chickens therefrom. In this manner, it may be seen that on the order of five hundred chickens may be supported from the cart and readily transported to and from laying houses.

The main object of this invention is to provide a cart which will provide a means whereby large numbers of live chickens may be readily transported from one location to another.

Another object of this invention is to provide a chicken carrying cart which will do away with the necessity of transporting chickens within individual chicken coops and which will therefore greatly reduce the time in handling chickens to be transported and also result in a more "disease free" operation inasmuch as the cart of the instant invention may be more readily cleaned than a quantity of chicken coops capable of transporting the same number of chickens.

A still further object of this invention is to provide a chicken carrying cart specifically designed for ease in navigating the narrow corridors of laying houses.

A further object of this invention is to provide a chicken carrying cart in accordance with the preceding objects and including novel ground engaging support wheel assemblies.

Yet another object of this invention, in accordance with the immediately preceding object, is to provide a chicken carrying cart including a pulling handle operatively associated with dirigible wheel means on the cart in a manner such that the cart may be readily steered while being pulled along the aforementioned corridors.

A final object of this invention to be specifically enumerated herein is to provide a chicken carrying cart which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged fragamentary side elevational view of the cart;

FIGURE 4 is an enlarged fragmentary transverse vertical sectional view taken substantially upon the plane indicated by the section line 4—4 of FIGURE 3;

Figure 1:
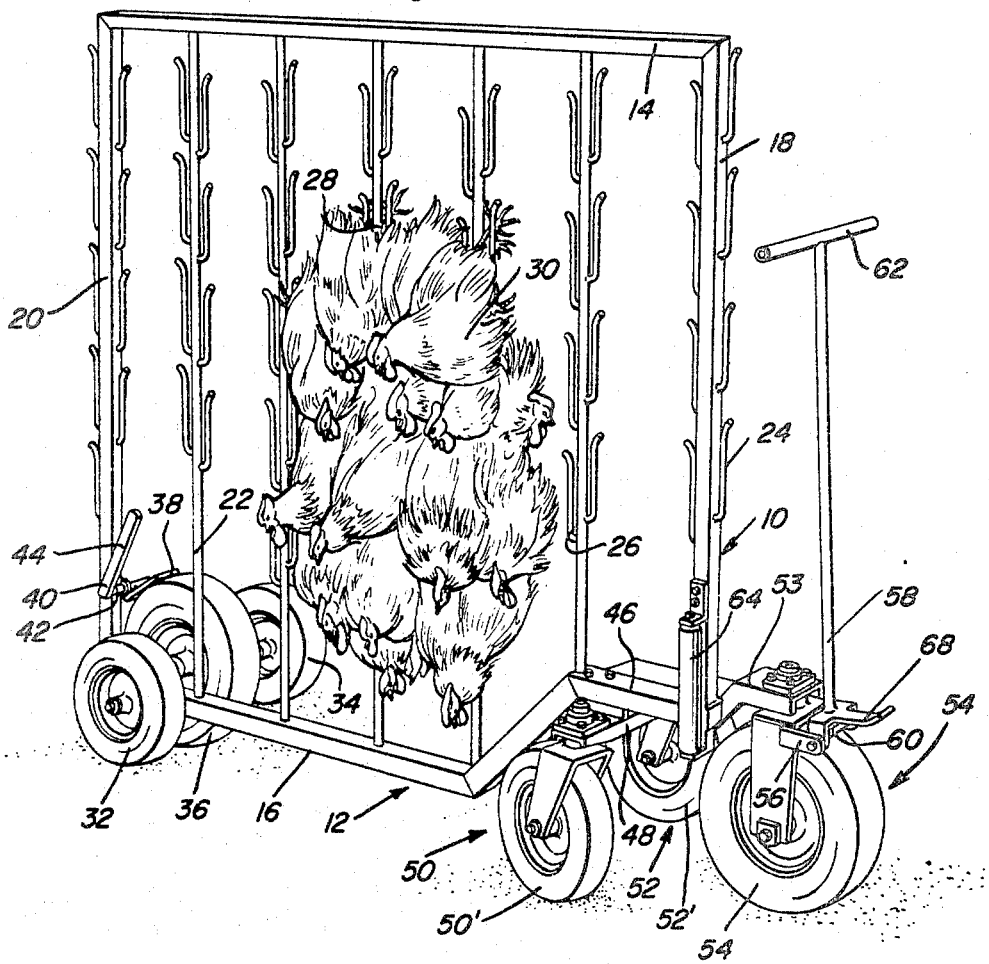
FIGURE 1 is a perspective view of the chicken carrying cart of the instant invention with the pulling handle thereof in a substantially vertical position braking the center front dirigible wheel and with a plurality of chickens supported from the cart.

FIGURE 5 is an enlarged fragmentary transverse vertical sectional view taken substantally upon the plane indicated by the section line 5—5 of FIGURE 3; and FIGURE 6 is a fragmentary side elevational view of the forward center dirigible wheel assembly of the cart with portions of the dirigible wheel assembly and the pulling handle being broken away and illustrated in longitudinal vertical section to more clearly illustrate the structural details thereof.

Referring now more specifically to the drawings the numeral 10 generally designates the cart of the instant invention which includes a main frame referred to in general by the reference numeral 12 consisting of upper and lower horizontally disposed longitudinal extending frame members 14 and 16 interconnected by means of a pair of front and rear uprights 18 and 20 as well as a plurality of intermediate uprights 22.

The uprights 18, 20 and 22 are each provided with a plurality of vertically spaced outstanding hook members 24 which project from the front and rear sides of the uprights 18, 20 and 22 and which are vertically elongated and open upwardly so as to define vertically elongated upwardly opening notches or hooks 26 in which the legs 28 of a plurality of inverted chickens 30 may be engaged during transport of the chickens to and from laying houses and the like and along the narrow corridors of laying houses.

Each of the hooks or hook portions 24 is of a vertical extend to have as many as eight pairs of chicken legs supported therefrom and it will be noted that the bodies of the chickens 30 supported from the hook portions 24 may be disposed on both sides of the upstanding longitudinal plane in which the upstanding portions 18, 20 and 22 are disposed.

The rear of the frame 12 includes a pair of small diameter laterally outwardly spaced opposite side rear wheels 32 and 34 which are rotatable about axes fixed relative to the frame 12. In addition, the rear end of the frame 12 also includes a center larger diameter rear wheel 36 spaced outwardly of the side of the frame 12 on which the wheel 34 is disposed and which is also journaled for rotation about an axis fixed relative to the frame 12. The center wheel 36 has one flat arm portion 38 of a brake assembly bell crank 40 operatively associated therewith and the ball crank 40 is pivotally supported from the rear upright 20 as at 42 for rotation about a horizontal transverse axis, the other arm portion 44 of the bell crank 40 comprising an actuating lever whereby the flat arm portion 38 may be pressed into engagement with the rear wheel 36.

The forward end of the lower longitudinal member 16 includes an upwardly offset forward end portion 46 from which a transverse member 48 is supported, a pair of front opposite side dirigible wheel assemblies generally referred to by the reference numerals 50 and 52 being rotatably supported from the opposite ends of the transverse member 48 for rotation about vertical axes. In addition, the frame 12 includes a forwardly projecting tongue portion 53 secured to one side of the upwardly offset portion 46 and which has pivotally supported from its forward end portion a center forward dirigible wheel assembly 54. The dirigible wheel assembly 54 is rotatable about an upstanding axis and includes a pair of forwardly projecting flange portions 56 between which one end of a pulling and steering handle 58 is pivotally secured by means of a pivot pin 60.

The pulling and steering handle 58 is accordingly supported from the forward center dirigible wheel assembly 54 for rotation about a horizontal axis generally paralleling the axis of rotation of the wheel 54' of the wheel assembly 54 and the free end of the pulling and steering handle 58 includes a transversely extending handgrip portion 62 whereby the handle 58 may be grasped in both hands for pulling and steering the cart 10.

The lower peripheral portions of the wheels 32, 34 and 36 are disposed in substantially the same horizontal plane and the lower peripheral portions of the wheels 50' and 52' of the wheel assemblies 50 and 52 are disposed in substantially the same horizontal plane as the lower peripheral portion of the wheel 54.

The lower end of the front upright 18 includes a laterally outwardly spaced guide roller 64 journaled for rotation about an upstanding axis generally paralleling the upstanding portion 18 and the roller 64 is adapted to engage and roll along the cages or outwardly projecting troughs which extend along the corridors in laying houses.

Figure 2:
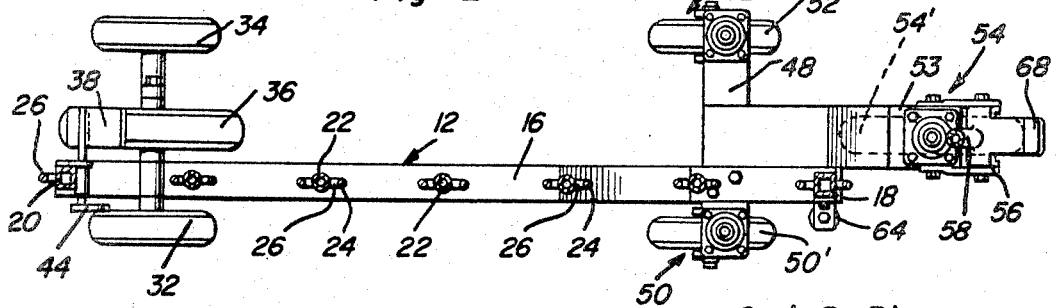
FIGURE 2 is a horizontal sectional view taken substantially upon a plane passing through the vertical center of the cart.

It will be noted from FIGURE 2 of the drawings that the roller 64 is disposed closely adjacent one side of the cart 10 and also that the upstanding longitudinal plane in which the upstanding portions 18, 20 and 22 are disposed is spaced transversely to the same side of the cart 10 from the centerline of the cart extending between the wheels 36 and 54'.

With reference now specifically to FIGURES 1 and 6 of the drawings it will be seen that the end of the handle 58 remote from the handgrip portion 62 includes a first laterally projecting tongue 68 which is adapted to engage and brake the wheel 54' when the handle 58 is in the substantially horizontally disposed position illustrated in FIGURE 6. In addition, the handle 58 also includes a transversely extending portion 70 which is shiftable into contact with the upper peripheral portions of the wheel 54' when the handle 58 is in the substantially vertically disposed position illustrated in FIGURE 1 of the drawings. Therefore, the front wheel 54' of the cart 10 may be braked with the handle 58 in either the horizontally disposed position or a vertically disposed position. Of course, the rear wheel 36 may be braked at any time in the manner hereinbefore set forth.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A cart adapted to freely pass along narrow corridors, said cart comprising a narrow upstanding longitudinal wheeled frame said frame including ground engaging support wheel means at the opposite front and rear end portions thereof, said wheel means at said front end portion of said frame including a pair of freely independently dirigible opposite side wheels on opposite sides of said frame and a center dirigible wheel disposed on a line extending longitudinally of said frame passing between said opposite side wheels, said center dirigible wheel including an elongated pulling handle for said cart swingable with said center wheel to steer cart, said pulling handle being oscillatable relative to said center wheel for swinging about an axis extending transversely of the base end of the handle and generally paralleling and fixed relative to the axis of rotation of said center wheel between an upstanding position and a generally horizontally disposed position, said handle including friction brake means engageable with the peripheral edge of center wheel upon movement of said handle to said generally horizontal position.

2. The combination of claim 1 wherein said frame includes longitudinally spaced upstanding portions, said upstanding portions each including means defining vertically spaced upwardly opening hook portions adapted to have the legs of inverted poultry such as chickens removably supported therefrom, said frame also including an upper longitudinal member and a lower longitudinal member between which at least some of said upstanding portions extend and to which the upper and lower ends of said some upstanding portions are secured.

3. The combination of claim 1 wherein said means defining said hook portions comprise hooks outstanding from said upright positions and spaced vertically therealong.

4. The combination of claim 3 wherein said hooks outstand from said upright portions into the areas disposed between adjacent upstanding portions.

5. The combination of claim 4 wherein said hooks outstand from both the front and rear sides of at least some of said upright portions.

6. The combination of claim 1 wherein said wheel means at the rear end portion of said frame also include a center wheel disposed on a line extending longitudinally of said frame between said front opposite side wheels and opposite side rear wheels disposed on opposite sides and outwardly of said rear center wheel.

7. The combination of claim 1 wherein said handle also includes a second friction brake means engageable with the peripheral edge of said center wheel upon movement of said handle to said upstanding position.

References Cited

UNITED STATES PATENTS

| 623,157 | 4/1899 | Hunter | 280—79.3 |
| 2,514,308 | 7/1950 | Burg | 280—79.3 |
| 2,583,196 | 1/1952 | Zawder et al. | 280—79.3 |
| 2,760,647 | 8/1956 | Saul | 280—79.3 X |
| 2,966,991 | 1/1961 | Duffner | 280—79.3 X |

FOREIGN PATENTS 1,079,684   4/1960   Austria.

LEO FRIAGLIA, Primary Examiner

J. E. SIEGEL, Assistant Examiner